United States Patent [19]

Shu

[11] Patent Number: 4,974,677
[45] Date of Patent: * Dec. 4, 1990

[54] PROFILE CONTROL PROCESS FOR USE UNDER HIGH TEMPERATURE RESERVOIR CONDITIONS

[75] Inventor: Paul Shu, West Windsor, N.J.

[73] Assignee: Mobil Oil Corporation, Fairfax, Va.

[ * ] Notice: The portion of the term of this patent subsequent to Feb. 14, 2006 has been disclaimed.

[21] Appl. No.: 422,200

[22] Filed: Oct. 16, 1989

[51] Int. Cl.$^5$ .................... E21B 33/138; E21B 43/22; E21B 43/24

[52] U.S. Cl. .................... 166/270; 166/272; 166/274; 166/295; 166/288; 523/130

[58] Field of Search ............... 166/270, 272, 273, 274, 166/288, 295, 300, 303; 523/130

[56] References Cited

U.S. PATENT DOCUMENTS

| | | | |
|---|---|---|---|
| 3,344,063 | 9/1967 | Stratton . | |
| 4,009,755 | 3/1901 | Sandiford | 166/270 |
| 4,069,869 | 1/1978 | Sandiford | 166/270 |
| 4,155,405 | 5/1979 | Vio | 166/295 |
| 4,413,680 | 11/1983 | Sandiford et al. | 166/270 |
| 4,440,228 | 4/1984 | Swanson | 166/274 |
| 4,444,261 | 4/1984 | Islip | 166/272 |
| 4,461,351 | 7/1984 | Falk | 166/295 |
| 4,461,352 | 7/1984 | Falk | 523/130 X |
| 4,485,875 | 12/1984 | Falk | 166/295 |
| 4,744,418 | 5/1988 | Sydansk | 166/295 X |
| 4,799,548 | 1/1989 | Mumallah et al. | 166/295 X |
| 4,804,043 | 2/1989 | Shu et al. | 166/261 X |
| 4,844,168 | 7/1989 | Sydansk | 166/295 X |

Primary Examiner—George A. Suchfield
Attorney, Agent, or Firm—A. J. McKillop; C. J. Speciale; M. J. Mlotkowski

[57] ABSTRACT

A process for selectively plugging zones of high permeability within an oil-bearing subterranean formation. The process of the present invention comprises the steps of injecting into the formation a high temperature selective gel-forming composition comprising an aqueous solution of a high molecular weight polyacrylamide having 30 percent or less hydrolysis, and an effective amount of a crosslinking agent which is a mixture of a phenolic component and an aldehyde, and gelling the solution in-situ by thermally reacting said gel-forming composition at a temperature effective to promote gelation. The resultant gel is exceptionally thermally stable and, therefore, can be used as an effective profile control agent in all thermal enhanced oil recovery operations, including steam flooding. Also provided is a process for recovering oil from a subterranean oil-bearing formation.

19 Claims, 6 Drawing Sheets

FIG. 5

TEMPERATURE DISTRIBUTION FOR STEAMFLOOD

FIG. 6

PROFILE CONTROL PROCESS FOR USE UNDER HIGH TEMPERATURE RESERVOIR CONDITIONS

FIELD OF THE INVENTION

This invention relates to a process for controlling the permeability of subterranean oil-bearing formations in situations when high temperatures are encountered and, more particularly, to such a process wherein a temperature selective polymeric gel-forming composition is utilized.

BACKGROUND OF THE INVENTION

As is usually the case, when an oil well is first drilled, oil will often flow from the well under the natural pressure existing in the reservoir. When this natural pressure becomes insufficient, further quantities of oil may be recovered through the use of mechanical pumps. However, it is usually possible to recover only a small fraction of the total oil present in the formation by such so-called primary recovery methods. To recover oil beyond that produced by primary methods, a variety of supplemental production techniques have been employed. In these supplemental techniques, commonly referred to as secondary or tertiary recovery operations, a fluid is introduced into the oil-bearing formation in order to displace oil to a production system comprising one or more production wells. The displacing or "drive" fluid may be an aqueous liquid such as brine or fresh water, a gas such as carbon dioxide, steam or dense-phase carbon dioxide, an oil-miscible liquid such as butane, or an oil and water-miscible liquid such as an alcohol. Often, the most cost-effective and desirable secondary recovery methods involve the injection of steam. In practice, a number of injection and production wells will be used in a given field arranged in conventional patterns such as a line drive, a five spot or inverted five spot, or a seven spot or inverted seven spot.

In the use of the various flooding techniques, it has become a common expedient to add various polymeric thickening agents to the drive fluid to increase its viscosity to a point where it approaches that of the oil which is desired to be displaced, thus improving the displacement of oil from the formation. The polymers used for this purpose are often said to be used for "mobility" control.

Another problem encountered is that certain injected drive fluids may be much lighter than the reservoir fluids and thus separate by gravity, rising toward the top of the flowing region and resulting in the bypassing of the lower regions. This phenomena is known as gravity override.

Also encountered in the use of the various flooding techniques is a situation caused by the fact that different regions or strata often have different permeabilities. When this situation is encountered, the drive fluid may preferentially enter regions of higher permeability due to their lower resistance to flow rather than the regions of low permeability where significant volumes of oil often reside.

It therefore is often desirable to plug the regions of high permeability, or "thief" zones, either partly or entirely, so as to divert the drive fluid into regions of lower permeability. The mechanical isolation of these thief zones has been tried but vertical communication among reservoir strata often renders this method ineffective. Physical plugging of the high permeability regions by cements and solid slurries has also been tried with varying degrees of success; however, these techniques have the drawback that still productive sites may be permanently closed.

As a result of these earlier efforts, the desirability of designing a slug capable of sealing off the most permeable layers so that the drive fluid would be diverted to the underswept, "tighter" regions of the reservoir, became evident. This led to the use of oil/water emulsions, as well as gels and polymers for controlling the permeability of the formations. This process is frequently referred to as "flood conformance" or "profile control", a reference to the control of the vertical permeability profile of the reservoir. Profile control agents which have been proposed include oil/water emulsions, gels, e.g., lignosulfate gels and polymeric gels, with polymeric gels being the most extensively applied in recent years.

Among the polymers so far examined for improving flood conformance are polyacrylamides, polysaccharides, celluloses, furfural-alcohol and acrylic/epoxy resins, silicates and polyisocyanurates. A major part of this work has been conducted with the polyacrylamides, both in their normal, non-crosslinked form, as well as in the form of metal complexes, as described, for example, in U.S. Pat. Nos. 4,009,755, 4,069,869 and 4,413,680. In either form, the beneficial effects derived from these polyacrylamides seem to dissipate rapidly due to shear degradation during injection, low pH and high temperature. To overcome these problems and to achieve deeper polymer penetration into the reservoir, dilute solutions of these polymers have sometimes been injected first and then complexed in-situ.

Another group of polymeric thickeners which has received considerable attention for use in improving flooding are polysaccharides, particularly those produced by the action of bacteria of the genus Xanthomonas on carbohydrates. For example, U.S. Pat. Nos. 3,757,863 and 3,383,307 disclose a process for mobility control by the use of polysaccharides.

U.S. Pat. Nos. 3,741,307, 4,009,755 and 4,069,869 disclose the use of polysaccharides in the control of reservoir permeability. U.S. Pat. No. 4,413,680 describes the use of crosslinked polysaccharides for selective permeability control in oil reservoirs.

Another type of polysaccharide which has been experimented with in the area of profile control is the non-xanthan, heteropolysaccharide S-130. S-130 belongs to the group of welan gums and is produced by fermentation with a microorganism of the genus Alcaligenes. Another welan gum heteropolysaccharide, known as S-194, is also produced by fermentation with a microorganism of the genus Alcaligenes. U.S. Pat. No. 4,658,898 discloses the use of welan gum S-130 in saline waters. Additionally, crosslinking with organic compounds containing at least two positively charged nitrogen atoms is disclosed in U.S. Pat. No. 4,658,898; while Ser. No. 283,399, filed on Dec. 12, 1988, discloses welan gums crosslinked with phenolic resins or mixtures of phenols and aldehydes.

The use of various block copolymers for mobility control in flooding operations is described in U.S. Pat. Nos. 4,110,232, 4,120,801 and 4,222,881. Chung et al., U.S. Pat. No. 4,653,585, disclose the use of block copolymers, which may be crosslinked with polyvalent metal ions, for use as permeability control agents in enhanced oil recovery applications.

While a number of the different compositions discussed have been proposed for permeability control, some of these compositions under certain circumstances. For example, the polymers of Chung et al, may not be effectively crosslinked with polyvalent metal ions under all conditions encountered in the enhanced oil recovery applications, e.g., in acidic conditions. Polyacrylamides are known to display instability in the presence of high brine concentration or temperatures over 70° C. Xanthan gums, while being very brine tolerant, display poor thermal stability, even at temperatures below 60° C. Still, other polymers are unsuitable as permeability control agents when used in conjunction with steam flooding operations. This is due to the fact that they lose their structural integrity (i.e., they undergo "syneresis" or chemical decomposition) at the high temperatures generated during such operations.

Syneresis is the contraction or shrinking of a gel so that liquid is exuded at the gel surface. For example, a gel said to exhibit 20% syneresis would take up 80% of its original volume, with the remaining 20% being expelled water. Although the exact mechanism responsible for the syneresis of such gel-forming compositions is not fully understood, it is believed to result from the over-crosslinking of the polymeric material with time. While it is not yet known what an acceptable level of syneresis might be for profile control gels, it is believed that to minimize syneresis would enhance the effectiveness of such gels.

While low syneresis under high temperature reservoir conditions is one desirable feature of a polymeric gel for use in thermal enhanced oil recovery methods such as steam flooding, another beneficial feature is gel selectivity. As mentioned, selectivity is the ability to seek out and/or form a gel in the zones of higher permeability, rather than plug the zones of lower permeability where oil is likely to reside. Several means to impart selectivity to a gel or gel-forming composition are known. These include the use of shear-thinning, high viscosity polymeric gels which can be formed ex-situ pumped into the formation and subsequently reheal. Gels produced by the crosslinking of biopolymers often possess this ability, although their use in thermal enhanced oil recovery situations is suspect. Such polymeric solutions can then be complexed in-situ or formulated to crosslink slowly with time in the reservoir.

U.S. Pat. No. 4,074,757 discloses a method of selectively plugging the undesirable zones and channels of oil bearing reservoirs during high temperature oil recovery processes such as steam flooding, underground combustion flooding or a naturally occurring high temperature reservoir, or the like. Improved sweep efficiency is obtained by injecting a gel-forming solution consisting essentially of sodium or ammonium lignosulfonate and water or brine in the absence of other gelation promoters and then allowing the high temperatures of the underground formation to promote gelation. Other teaching of the use of polymers for injection as monomeric solutions to be subsequently polymerized in-situ include U.S. Pat. Nos. 4,461,351 and 4,637,467. The processes disclosed therein are not selective since the monomers can penetrate into the high as well as the low permeability zones of the formation before they polymerize and packers are required to inject the monomer into selected portions of the formation.

In view, therefore, there is a need for a method of selectively plugging highly permeable zones of a subterranean oil-bearing formation utilizing thermally-stable materials suitable for high temperature wells, steam flooded wells and the like.

It is, therefore, an object of the present invention to provide a process for selectively plugging highly permeable zones of a subterranean oil-bearing formation through the use of a polymeric gel-forming composition having good thermal stability under harsh conditions.

It is another object of the present invention to provide a process for the selective plugging of zones of high permeability within an oil-bearing formation when conditions of high temperature are encountered which utilizes a temperature selective gel-forming polymeric composition.

It is a further object of the present invention to provide a process for the selective plugging of zones of high permeability within an oil-bearing formation wherein the temperature at which the gelation reaction is activated may be adjusted in accordance with reservoir conditions.

It is yet another object of the present invention to provide a steam-flood enhanced oil recovery process which utilizes a high temperature stable gel-forming composition.

Other objects and the several advantages of the present invention will become apparent to those skilled in the art upon a reading of the specification and the claims appended thereto.

SUMMARY OF THE INVENTION

According to the present invention, there is provided a process for selectively plugging zones of high permeability within an oil-bearing subterranean formation. The process comprises the steps of injecting into the formation a high temperature selective gel-forming composition comprising an aqueous solution of a high molecular weight polyacrylamide having 30 percent or less hydrolysis, and an effective amount of a crosslinking agent which is a mixture of a phenolic component and an aldehyde, and gelling the solution in-situ by thermally reacting said gel-forming composition at a temperature effective to promote gelation. The resultant gel is exceptionally thermally stable and, therefore, can be used as an effective profile control agent in all thermal enhanced oil recovery operations, including steam flooding. Also provided is a process for recovering oil from a subterranean oil-bearing formation.

DESCRIPTION OF THE PREFERRED EMBODIMENTS

The present invention relates to a process for selectively plugging the more permeable zones of an underground oil-bearing formation and may be advantageously practiced when high formation temperatures are encountered and/or when thermal enhanced oil recovery operations are practiced. Such thermal recovery operations include steam flooding, cyclic steam flooding and the like. The gel-forming composition preferred for use in the practice of the present invention is temperature selective in nature; that is, it forms a thermally stable rigid gel under high temperature conditions. The process of the present invention is best understood by refering to the appended figures, which are given by way of example and not of limitation.

Figure 1:
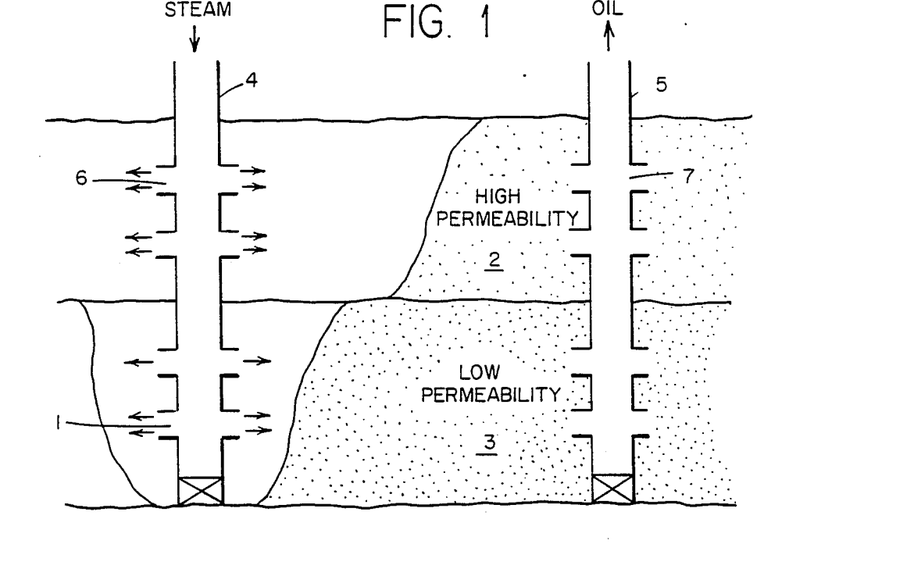
FIG. 1 illustrates the problem associated with thermal enhanced oil recovery operations wherein zones of varied permeability are encountered, (note the selective entry of steam into the zone of higher permeability).

Referring now to FIG. 1, a subterranean oil-bearing formation 1, containing an upper zone of high permeability 2 and a lower zone of low permeability 3 is schematically depicted. The formation is penetrated by an injection well 4 and a production well 5, which are spaced apart in the usual manner. As is shown, steam is injected into injection well 4 and penetrates the formation by exiting through multiple perforations 6. The advancing steam front will force formation fluids, including oil, toward production well 5, entering same through perforations 7. Consistent with the depiction of FIG. 1, the steam front will preferentially enter the zone of high permeability 2 due to its inherently low resistance to flow, although some steam will likely enter the low permeablity zone 3, also. As those skilled in the art will plainly recognize, this well known process enhances the quantity of oil produced by heating the oil present in the formation and thus reducing its viscosity, as well as the force required to displace the oil from the formation.

As may be envisioned, the effectiveness of such a thermal enhanced oil recovery process is greatly reduced by the preferential flow of steam through the zone of high permeability 2. This is particularly so when the steam front "breaks through" to the production well. At that point a low resistance path for steam travel is established, with the result that even less steam is likely to pass to low permeablity zone 3. It is at this point in time that great benefit may be achieved by the practice of the process of the present invention.

Figure 2:
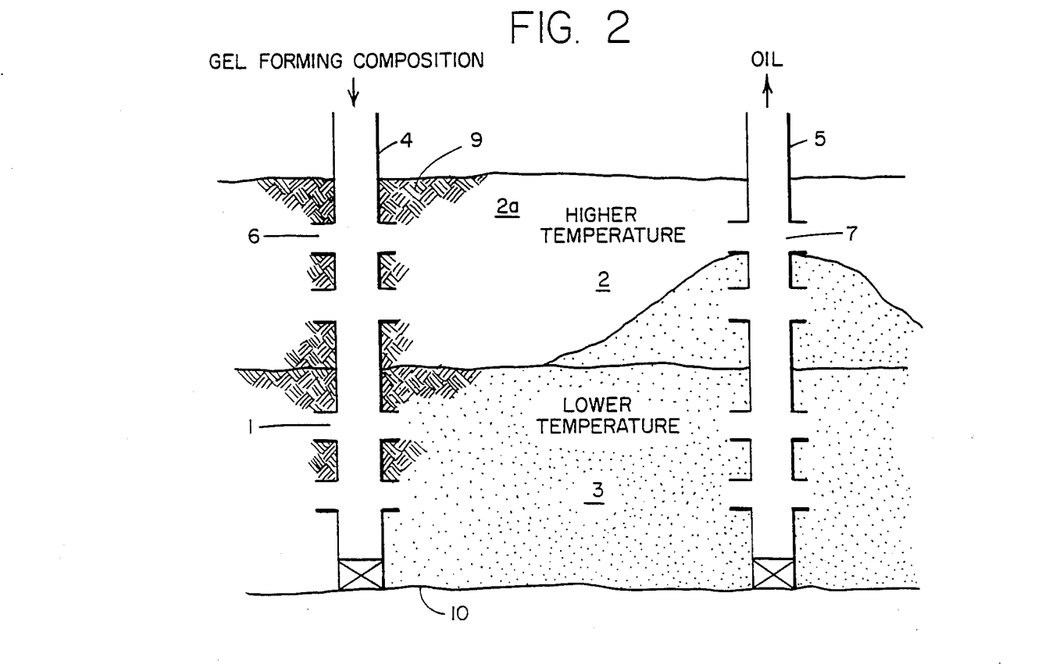
FIG. 2 shows the injection of a temperature selective gel-forming composition into the formation.
Figure 3:
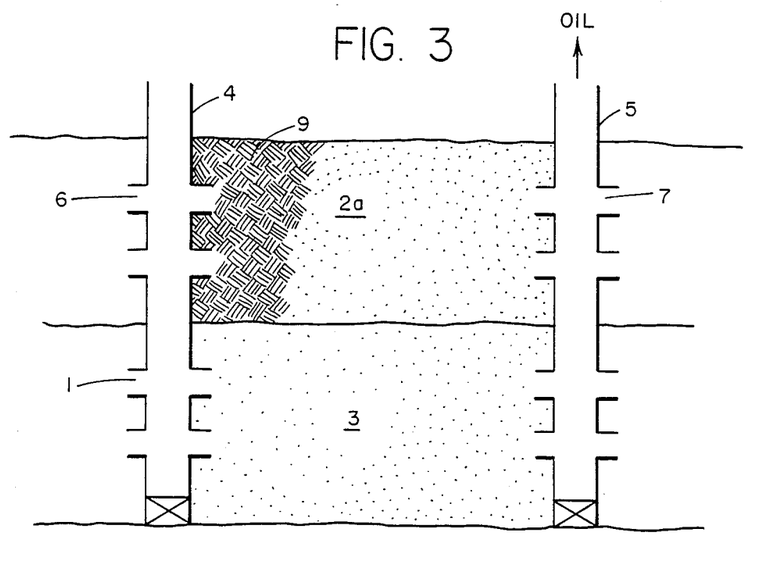
FIG. 3 shows the injected composition having gelled in the zone of higher permeability as a result of the higher temperatures present within that zone.

Referring now to FIG. 2, the thermal conditions likely existing within the formation at the time of steam break-through are shown. As indicated, the more thoroughly steam-swept zone 2a of high permeability zone will generally exhibit a higher formation temperature than that of the zone of lower permeability 3 due to the fact that less steam passed through that zone. A gel-forming composition having temperature selective properties is then placed within the formation by injecting same via injection well 4. The composition so placed will form a gel zone 9 within the formation. As was the case with the steam, the bulk of the non-gelled composition will flow through the high permeability zone 2 due to its lower resistance to flow, although some of the material will likely find its way into the low permeabiliy zone 3, as well. However, due to the temperature selectivity of the gel-forming composition and the lower inherent temperatures of the low permeability zone 3, the material which migrates to the low permeability zone 3 will not gel.

Figure 5:
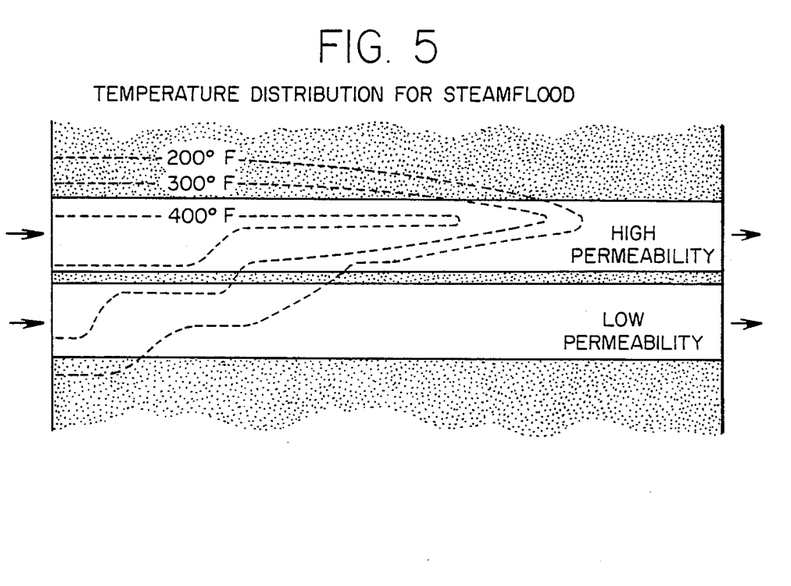
FIG. 5 shows a typical temperature distribution for a steam flood in a subterranean oil-bearing formation having varying permeabilities.

The gelation kinetics of the gel-forming composition preferred for use in the practice of the process of the present invention is such that the rate of formation of gel is greatly accelerated at conditions of high temperature (about 300° F. or higher) such as are encountered in steam flooding enhanced oil recovery operations. (See FIG. 6). As mentioned, the temperature selective gel-forming composition is allowed to gel in the formation. As indicated in FIG. 5, the temperature distribution within the formation is non-uniform and can depend in large part on whether the steam flood has swept through a region or not. As such, consistent with FIG. 6, such a composition will gel at different rates.

Figure 6:
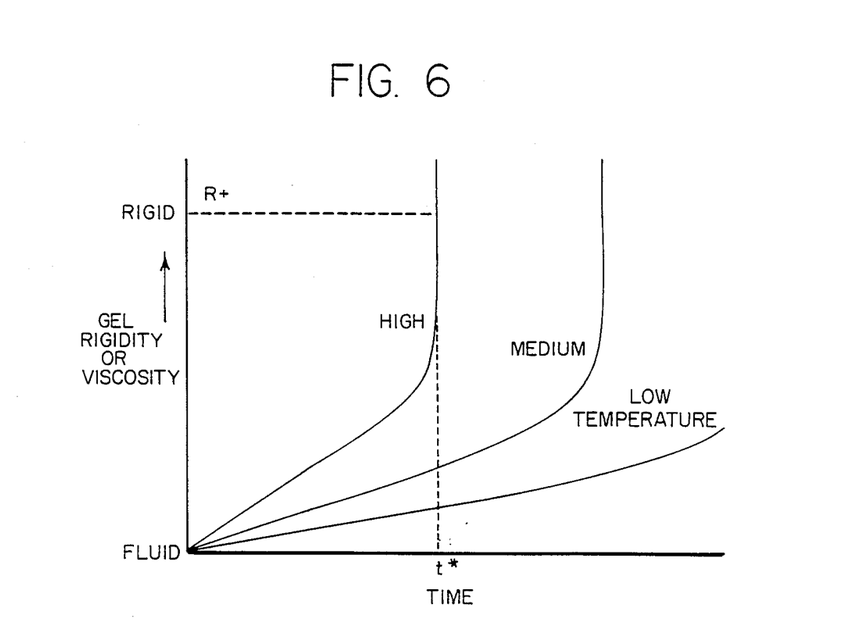
FIG. 6 illustrates the relationship between gel rigidity or viscosity and gelation time at various temperatures of interest for a preferred selective gel-forming composition.

Referring again to FIG. 6, once the desired quantity of gel-forming composition has been injected into the formation, a predetermined period of time ($t^*$) is allowed to pass to permit the compositon in the upper steam-swept zone of the formation (see FIG. 2) having higher temperatures to gel to a desired rigidity ($R^*$). As indicated in FIG. 6, $t^*$ will not be a period of time sufficient to permit the material which migrated to the cooler zone to gel and thus the material therein will remain fluid. Note that rigidity can be measured in terms of gel viscosity or by other empirical or visual means.

Figure 4:
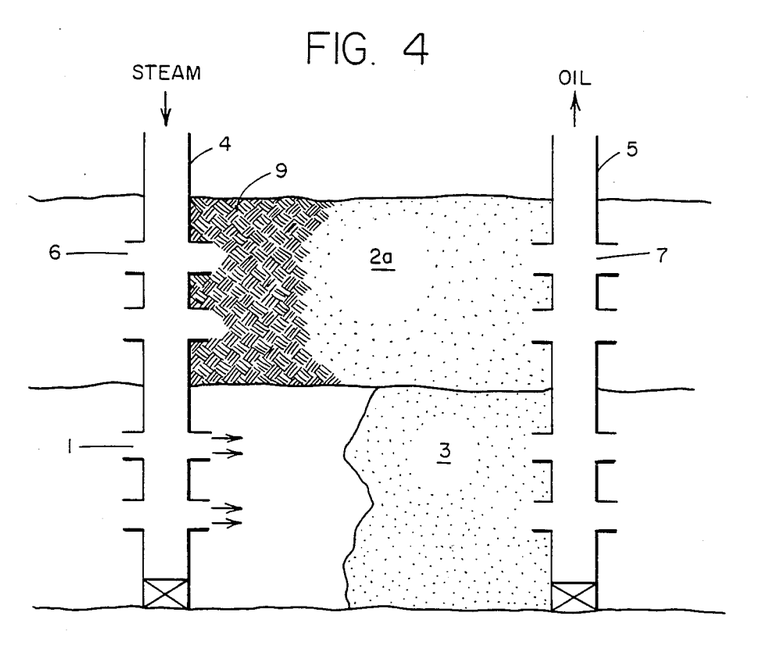
FIG. 4 illustrates the introduction of steam following gelling of the injected composition and the preferential entry of the steam into the less permeable zone of the formation.

Referring back to FIG. 2, excess non-gelled material may be removed once the material in the high permeability zone 2 gels, by flushing with water, by back-flushing as disclosed in U.S. Pat. No. 4,804,043, a co-inventor of which is the inventor of the present invention, or by any technique known to those skilled in the art. The contents of U.S. Pat. No. 4,804,043 are hereby incorporated by reference in their entirety. Likewise, depending on reservoir characteristics, well layout, the characteristics of the gel-forming compostion used, etc., it may be possible to go directly back into production using thermally-enhanced oil recovery, without the removal of ungelled material, since the ungelled material may actually be produced with the reservoir fluids before having sufficient time to gel within the low permeability zone 3. FIG. 4 shows the reservoir back in the production mode following the successful completion of the selective plugging process of the present invention. Note that gel zone 9 effectively blocks the passage of steam from the injection well to high permeability zone 2.

As FIG. 4 illustrates, the desired effect can be achieved without plugging the entire high permeability zone 2, although steam will likely migrate back into that zone once it progresses sufficiently beyond gel zone 9, as indicated by steam swept zone 2a. The quantity of the temperature selective gel-forming composition required to gain significant benefit from the plugging process of the present invention will vary from formation to formation and has been found to equate to a distance equal to at least about 5 percent to about 30 percent of the pore volume of the highly permeable zone 2, such quantity being preferred from the standpoint of production economics. This amount will vary depending on the porosity, thickness, oil and water saturation characteristics and the like.

Examples of polymeric materials for use in making the temperature selective gel-forming compositions required in the practice of the present invention include polyacrylamides and polyacrylamide copolymers. Any water-dispersible or water-soluble polyacrylamide polymer or copolymer capable of forming stable aqueous gels in the presence of an organic crosslinking agent is contemplated for use herein. Polyacrylamides having varying degrees of hydrolysis can be used as long as the degree of hydrolysis does not exceed 98 percent. It is preferred that the degree of hydrolysis not exceed 30 percent, with polyacrylamides having a degree of hydrolysis of less than 5 percent particularly preferred. Copolymers containing acrylamide units which are preferred are those having a molar ratio of acrylamide comonomer in excess of 2 percent. The molecular weight of polyacrylamide or polacrylamide copolymer should be at least 10,000 to be useful and preferably in the range of about one million to about 20 million. The molecular weight range of about 10 to about 20 million is to be understood as being the most preferred. Extremely high molecular weight materials should be avoided as they may cause difficulties in polymer solubilization, pumping and injection of the gel-forming composition due to inherently high viscosity.

Polyacrylamide polymers and copolymers and the synthesis thereof are described in detail by J. D. Morris and R. J. Penzenstadler in Kirk-Othmer ENCYCLOPEDIA OF CHEMICAL TECHNOLOGY, Third Edition, John Wiley & Sons, New York, 1978, Volume 1, pages 298–330, the entire contents of which are incorporated by reference herein. U.S. Pat. No. 4,034,809 teaches a method for partial hydrolysis of polyacrylamide and is incorporated by reference for these details. Such polymers and copolymers may be obtained from the Aldrich Chemical Company of Milwaukee, Wis., American Cyanamid of Wayne, N.J. and other sources.

The crosslinking agent useful in the practice of this invention is a mixture of a phenolic component and an aldehyde. Phenolic components suitable for use in the present invention are phenol or derivatives thereof, such as catechol, resorcinol, phloroglucinol, pyrogallol, 4,4'-diphenol, and 1,3-dihydromynaphthalene. Other phenolic components that can be used include at least one member of selected oxidized phenolic materials of natural or synthetic origin, such as 1,4-benzoquinone, hydroquinone or quinhydrone, as well as a natural or modified tannin, such as quebracho or sulfomethylated quebracho possessing a degree of sulfomethylation (DSM) up to about 50. (See U.S. Pat. No. 3,344,063, Col. 3, lines 15–32, which is hereby incorporated herein by reference). The DSM of sulfomethylated quebracho (SMQ) is sometimes indicated as, for example, SMQ 50 for SMQ having a DSM of 50. Phenol is the preferred phenolic compound for use in the present invention.

Any suitable water-dispersible aldehyde can be used in the practice of the invention. Thus, under proper conditions of use, both aliphatic and aromatic monoaldehydes, and also dialdehydes, can be used. The aliphatic monoaldehydes containing from one to about 10 carbon atoms per molecule are preferred. Representative examples of such aldehydes include formaldehyde, paraformaldehyde, acetaldehyde, propionaldehyde, butyraldehyde, isobutyraldehyde, valeraldehyde, heptaldehyde and decanal. Representative examples of dialdehydes include glyomal, glutaraldehyde and terephthaldehyde. Various mixtures of such aldehydes can also be used in the practice of the invention. The term "water-dispersible" is employed generically herein to include both, those aldehydes which are truly water-soluble and those aldehydes of limited water solubility but which are dispersible in water or other aqueous media to be effective gelling agents. Formaldehyde is the preferred aldehyde compound used in the present invention.

Specific examples of suitable phenolic and water-dispersible aldehyde components are set forth in Swanson, U.S. Pat. No. 4,440,228, the entire contents of which are incorporated herein by reference. The preferred combination of a phenolic and water-dispersible aldehyde is phenol/formaldehyde.

Relative amounts of phenolic and aldehyde components are also set forth in Swanson. These amounts are small but effective to cause the gelation of an aqueous dispersion of the copolymer and the crosslinking agent. Thus, the amount of the phenolic component used herein is about 2 to about 20, preferably about 3 to about 10, and most preferably about 3 to about 6 percent by weight. Rigid and more thermally stable gels are generally formed at higher phenol concentrations. Phenol to aldehyde molar ratios of between about 1:1 to 1:4 are preferred. As such, the amount of aldehyde is about 0.002 to about 15 weight percent, preferably about 3 to about 10 and most preferably about 3 to about 7 weight percent. The above amounts are calculated on the basis of the total weight of the composition comprising the water, the copolymer and the crosslinking agent.

The amount of polyacrylamide or polyacrylamide copolymer required to produce the gel-forming compositions of the present invention will generally be in the range of about 0.5 to about 10.0 weight percent in order to achieve the desired gel consistency; in most cases, however, concentrations of 0.5 to 5.0 weight percent will be adequate and normally preferred, although reservoir conditions may require other concentrations. Generally, stronger and more stable gels are formed at higher copolymer concentrations. The molecular weight of the copolymer used will also affect the amount of material required to form advantageous gels. Generally, the higher the molecular weight the lower the amount required to form a stable gel.

The gel-forming compositions of the invention can be prepared on the surface, in a suitable tank equipped with suitable mixing means, and then pumped down the well and into the formation employing conventional equipment for pumping such compositions. Additionally, it is within the scope of the invention to prepare these compositions while they are being pumped down the well. For example, a solution of the polymer in water can be prepared in a tank adjacent to the wellhead. Pumping of this solution through a conduit to the wellhead can then be started. Then, downstream from the tank, a suitable connection can be provided for introducing a crosslinking agent of this invention. As will be understood by those skilled in the art, the rate of introduction of the crosslinking agents into the conduit will depend upon the pumping rate of the copolymer solution through the conduit. Any of the above-mentioned orders of addition can be employed in such an in situ technique. Mixing orifices or baffles can be provided in the conduit, if desired.

When gelation is to take place at lower temperatures (<350° F.), base catalysts such as NaOH, Ba(OH)$_2$, Ca(OH)$_2$, Na$_2$CO$_3$ or the like may be required to assist the reaction. The amount of base catalyst required will depend upon the the temperature at which gelation is desired to take place. As such, it can be seen that it may be desirable to formulate several compositions having different levels of base catalyst in the laboratory so that the functional relationship between gel temperature and catalyst dosage can be developed. Doing this can permit precise tailoring of the composition to the conditons present in the formation at the time of injection. In this manner, the effect of heat loss from the zone of high permeability resulting from the termination of steam injection can be accounted for during injection of the gel-forming composition.

The following examples further illustrate the essential features of the invention. However, it will be apparent to those skilled in the art that the specific conditions used in the examples do not limit the scope of the invention.

EXAMPLES 1-4

Two samples of high molecular weight polyacrylamide were obtained from American Cyanamid of Wayne, N.J. to test their ability to form thermally stable, organically crosslinked gels. One sample, marketed as 900 N, was an unhydrolyzed material, the other sample, marketed as 905 N, was 5 percent hydrolyzed. The compositions of Examples 1-4 were prepared in a synthetic sea water brine. Thermal stability of those compositions were determined by subjecting small samples thereof (about 10 gr) to a temperature of about 400° F. for an extended time period. The samples, in small glass vials, were inserted into stainless steel bombs (1" O.D. tubing with Swagelock caps), partially surrounded with water, sealed, placed in an oven, and maintained at the temperature of about 400° F. for the length of time indicted in Table 1. After the testing period, the degree of syneresis of each sample was determined by cooling the bomb to ambient temperature, removing the vial from the bomb, estimating the size of the polymer plug by measuring the height and diameter of the gel plug, and calculating the degree of syneresis (%) from the following equation:

$$\% \text{ Syneresis} = 100 \times \frac{\text{Sample Volume} - \text{Gel Volume}}{\text{Sample Volume}}$$

wherein:
"Sample Volume" is the initial volume of the sample before the heating treatment is commenced; and
"Gel Volume" is the final volume of the gel present in the vial after the heating treatment is terminated.

Results of the thermal stability tests are as follows:

TABLE 1

Polyacrylamide-Phenol-Formaldehyde Gel Test
Polyacrylamide Concentration = 2 Wt. %

| Example Number | Polymer Used | Concentration, % Phenol | HCHO | NaOH | Days @ 400° F. | Gel Syneresis % |
|---|---|---|---|---|---|---|
| 1 | 900N[1] | 4 | 4.2 | 0.02 | 21 | 0 |
| 2 | 900N | 4 | 5.1 | 0.02 | 21 | 0 |
| 3 | 905N[2] | 4 | 4.2 | 0.02 | 21 | 0 |
| 4 | 905N | 4 | 5.1 | 0.02 | 21 | 0 |

[1]Unhydrolyzed polyacrylamide obtained from American Cyanamid.
[2]Partially hydrolyzed (5%) polyacrylamide obtained from American Cyanamid.

As indicated, gels of excellent thermal stability were obtained in all cases. This finding was surprising since polyacrylamides are not known for thermal stability at temperatures of 400° F. The high degree of thermal stability is believed to result from the amide group of the polyacrylamide being stabilized by reacting with one or two of the methylol functionalities of the phenol-formaldehyde crosslinking agent.

EXAMPLES 5-7

This example demonstrates that a polyacrylamide gel system can be designed to treat a high permeability zone such as that depicted in FIG. 5. Assuming the presence of a temperature distribution such as that shown for the high permeabilty zone of the FIG. 5 formation, it is evident that a temperature selective gel system that would form a rigid gel at about 350° F. would be desired. Such a gel system was formulated by preparing an aqueous-based gel-forming composition, in the manner described for Examples 1-4, having the following compostion: 2% American Cyanamid 900 N unhydrolyzed polyacrylamide, 3% phenol and 3.9% formaldehyde. The following table demonstrates the gelation kinetics of the composition so prepared:

TABLE 2

Polyacrylamide-Phenol-Formaldehyde Gel Test

| Example Number | Temperature in Deg. F. | Observations at Day No. 1 | Observations at Day No. 2 |
|---|---|---|---|
| 5 | 210 | Not Gelled | Not Gelled |
| 6 | 300 | Fluid Gel | Fluid Gel |
| 7 | 400 | Solid Gel | Solid Gel |

Referring again to FIG. 6, it can be seen that at a temperature of about 350° F., the value of t* would be about one day. This means that, following the injection of this profile control treatment, the injection well would be shut down to permit the composition to form a stable gel. The ungelled polymer which may have migrated to the zone of lower permeability/lower temperature could be dealt with in any of the manners discussed above, as those skilled int the art would plainly recognize.

In another embodiment of the invention, the process of the present invention can also be applied to a steam drive process in any formation to reduce steam override thereby improving sweep efficiency. The problem of steam override is described in U.S. Pat. No. 4,444,261, the disclosure of which is hereby incorporated by reference. In a steam drive oil recovery process, steam is considerably lighter than the oil and water present in the formation and thus, because of gravity segregation, it tends to rise to the top of the formation until vertical communication exists. Consequently, the injected steam channels through the top of the formation to the producing well overriding a major portion of the formation and contacting only a small fraction of the formation oil. Once steam override has occurred, steam override inevitably leads to early steam breakthrough and afterwards continued injection of steam into the formation will accomplish very little additional oil recovery. This behavior results in an inefficient oil recovery and low vertical sweep efficiency. Using the present process, once steam breakthrough occurs at the production well thereby forming a steam swept zone in the formation due to steam override, injection of steam is terminated and a predetermined amount of a temperature selective gel-forming solution is injected into the formation that preferentially enters the steam-swept zone. Thereafter, sufficient time is allowed to permit the gel-forming solution to form a rigid gel in the steam-swept zone thereby effectively plugging the steam-swept zone. Ungelled material which may have migrated into the cooler zone of lower permeability may be removed if desired, as previously discussed. Thereafter, steam injection into the formation is resumed via the injection well and fluids including oil are recovered from the formation through the production well. Should steam breakthrough occur again, the process may again be repeated. The process can be continued through repetitious cycles thereby resulting in sweeping oil from a very significant percentage of the formation.

In still another embodiment, the process of the present invention may be applied to a cyclic steam stimulation process in a subterranean, oil-containing formation containing zones of varying permeability penetrated by at least one well in fluid communication with a substantial portion of the formation. Initially, a predetermined amount of steam is injected into the formation via the well that preferentially penetrates the relatively high permeability zones of the formation to form a steam-swept zone and to heat the viscous oil and reduce its viscosity. Thereafter, fluids including oil are produced from the well until the amount of oil recovered is unfavorable. If desired, a soak period may be utilized between steam injection and the production cycle. Thereafter, a predetermined amount of a temperature selective gel-forming solution is injected into the formation via the well that preferentially enters the steam-swept zone. The quantity of the temperature selective gel-forming solution required is that amount equal to 10 to 50% of the amount of oil produced in the prior production cycle. Thereafter, sufficient time is allowed to permit the gel-forming solution to form a rigid gel in the steam-swept zone thereby effectively plugging the steam-swept zone. In the next step, a predetermined amount of steam is injected into the formation that is diverted from the previously steam-swept zones into the lower, permeable unswept zones of the formation thereby heating additional oil and reducing its viscosity. Thereafter, after a soak period is completed, if one is used, fluids including oil are produced from the formation via the well until the amount of oil recovered is unfavorable. Multiple cycles of steam injection, production, plugging of the steam-swept zones with the temperature selective gel-forming solution followed by steam injection and production may be repeated for a plurality of cycles until the amount of oil recovered is unfavorable.

By the term "pore volume" as used herein, is meant that volume of the portion of the formation underlying the well pattern employed as described in greater detail in U.S. Pat. No. 3,927,716, the disclosure of which is hereby incorporated by reference.

While the invention has been described in terms of a single injection well and a single spaced apart production well, the method according to the invention may be practiced using a variety of well patterns. Any other number of wells, which may be arranged according to any pattern, may be applied in using the present method as illustrated in U.S. Pat. No. 3,927,716.

Although the present invention has been described with preferred embodiments, it is to be understood that modifications and variations may be utilized without departing from the spirit and scope of this invention, as those skilled in the art will readily understand. Such modifications and variations are considered to be within the purview and scope of the appended claims.

What is claimed is:

1. A process for selectively plugging zones of high permeability within a high temperature oil-bearing subterranean formation, comprising the steps of:
   (a) injecting into the formation a high temperature medium which preferentially enters the zones of high permeability;
   (b) injecting into the formation a high temperature selective gel-forming composition comprising an aqueous solution of a high molecular weight polyacrylamide having 30 percent or less hydrolysis, and an effective amount of a crosslinking agent which is a mixture of a phenolic component and an aldehyde; and
   (c) gelling the solution in-situ at a temperature effective to promote gelation.

2. The process of claim 1, wherein in step (b) the temperature effective to promote gelation is at least about 212° F.

3. The process of claim 2, wherein in step (a) the gel-forming composition further comprises a base catalyst in an amount effective to allow the composition to gel at the temperature prevailing in the high permeability zone of the formation.

4. The process of claim 1, wherein in step (b) the temperature effective to promote gelation is at least about 350° F.

5. The process of claim 4 wherein in step (a) said high molecular weight polyacrylamide is hydrolyzed 5 percent or less.

6. The process of claim 5, wherein in step (a) the molecular weight of the polyacrylamide is between about 10 million to about 20 million.

7. The process of claim 6 wherein in step (a) the phenol compound and the aldehyde compound of the crosslinking agent are each present in the gel-forming composition in an amount from about 3 to about 10 percent by weight.

8. The process of claim 7, wherein in step (a) said phenolic compound is phenol and said aldehyde component is formaldehyde.

9. The process of claim 8, wherein in step (a) said polyacrylamide is present in the gel-forming composition in an amount from between about 0.5 to about 10 weight percent.

10. A process for recovering oil from a subterranean oil-bearing formation having relatively high permeability zones and relatively low permeability zones penetrated by at least one injection well and at least one spaced-apart production well, said wells being in fluid communication with a substantial portion of the formation, comprising the steps of:
    (a) injecting into the formation a high temperature medium which preferentially enters the zones of high permeability;
    (b) injecting into the formation a high temperature selective gel-forming composition comprising an aqueous solution of a high molecular weight polyacrylamide having 30 percent or less hydrolysis, and an effective amount of a crosslinking agent which is a mixture of a phenolic component and an aldehyde;
    (c) gelling the solution in-situ at a temperature effective to promote gelation;
    (d) injecting a high temperature medium into the formation via the injection well; and
    (e) recovering fluids from the formation via the production well.

11. The process of claim 10, wherein in step (b) the temperature effective to promote gelation is at least about 212° F.

12. The process of claim 11, wherein in step (a) the gel-forming composition further comprises a base catalyst in an amount effective to allow the composition to gel at the temperature prevailing in the high permeability zone of the formation.

13. The process of claim 12, wherein in step (b) the temperature effective to promote gelation is at least about 350° F.

14. The process of claim 13 wherein in step (a) said high molecular weight polyacrylamide is hydrolyzed 5 percent or less.

15. The process of claim 14, wherein in step (a) the molecular weight of the polyacrylamide is between about 10 million to about 20 million.

16. The process of claim 15 wherein in step (a) the phenol compound and the aldehyde compound of the crosslinking agent are each present in the gel-forming composition in an amount from about 3 to 10 percent by weight.

17. The process of claim 16, wherein in step (a) said phenolic compound is phenol and said aldehyde component is formaldehyde.

18. The process of claim 17, wherein in step (a) said polyacrylamide is present in the gel-forming composition in an amount from between about 0.5 to about 10 weight percent.

19. The process of claim 10, wherein the high temperature medium is steam.

* * * * *